United States Patent
Roh et al.

(10) Patent No.: US 12,087,918 B2
(45) Date of Patent: Sep. 10, 2024

(54) VEHICLE BATTERY FIRE SENSING APPARATUS AND METHOD

(71) Applicant: LG ENERGY SOLUTION, LTD., Seoul (KR)

(72) Inventors: Tae Hwan Roh, Daejeon (KR); Hyung Jun Ahn, Daejeon (KR); Sung Gon Kim, Daejeon (KR); Su Chang Kim, Daejeon (KR); Hui Jeong Lee, Daejeon (KR); Do Wung Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 560 days.

(21) Appl. No.: 17/422,335

(22) PCT Filed: Jun. 29, 2020

(86) PCT No.: PCT/KR2020/008460
§ 371 (c)(1),
(2) Date: Jul. 12, 2021

(87) PCT Pub. No.: WO2021/015436
PCT Pub. Date: Jan. 28, 2021

(65) Prior Publication Data
US 2022/0109194 A1    Apr. 7, 2022

(30) Foreign Application Priority Data
Jul. 23, 2019  (KR) .................. 10-2019-0089225

(51) Int. Cl.
*H01M 10/42* (2006.01)
*B60L 3/00* (2019.01)
*H01M 10/48* (2006.01)

(52) U.S. Cl.
CPC .......... *H01M 10/425* (2013.01); *B60L 3/0046* (2013.01); *H01M 10/486* (2013.01);
(Continued)

(58) Field of Classification Search
CPC .......... B60L 2240/545; B60L 2270/12; B60L 3/0038; B60L 3/0046; B60L 3/0092;
(Continued)

(56) References Cited

U.S. PATENT DOCUMENTS

| 6,204,769 B1 | 3/2001 | Arai et al. |
| 2011/0059341 A1* | 3/2011 | Matsumoto ......... H01M 10/052 429/82 |

(Continued)

FOREIGN PATENT DOCUMENTS

| EP | 3 249 737 A1 | 11/2017 |
| JP | 11-25938 A | 1/1999 |

(Continued)

OTHER PUBLICATIONS

International Search Report (PCT/ISA/210) issued in PCT/KR2020/008460, dated Oct. 5, 2020.

(Continued)

*Primary Examiner* — Victoria H Lynch
(74) *Attorney, Agent, or Firm* — Birch, Stewart, Kolasch & Birch, LLP

(57) ABSTRACT

A vehicle battery fire sensing apparatus and method includes a battery pack mounted to a vehicle structure and an electronic control unit. The battery pack includes a battery module including one or more battery cells, a battery management system configured to transmit a signal received from the battery module to the electronic control unit, and a battery pack case having a gas discharge portion configured to allow venting gas to be discharged therethrough. The vehicle battery fire sensing apparatus further includes a sensor provided at the vehicle structure, the sensor being configured to measure at least one of the temperature or pressure of the gas discharged from the gas discharge portion.

15 Claims, 10 Drawing Sheets

(52) U.S. Cl.
CPC ............... *B60Y 2400/306* (2013.01); *H01M 2010/4271* (2013.01)

(58) Field of Classification Search
CPC .............. B60L 50/64; B60Y 2400/306; H01M 10/425; H01M 10/48; H01M 10/486; H01M 2010/4271; H01M 2200/20; H01M 2220/20; H01M 50/30
See application file for complete search history.

(56) References Cited

U.S. PATENT DOCUMENTS

| | | |
|---|---|---|
| 2011/0210859 A1 | 9/2011 | Kim |
| 2012/0150393 A1 | 6/2012 | Knight-Newbury et al. |
| 2012/0276423 A1 | 11/2012 | Asakura et al. |
| 2014/0097799 A1 | 4/2014 | Kim |
| 2014/0186668 A1 | 7/2014 | Jung et al. |
| 2014/0306519 A1 | 10/2014 | Song |
| 2018/0026312 A1 | 1/2018 | Hinterberger et al. |
| 2018/0048032 A1 | 2/2018 | Takatsuka et al. |
| 2019/0152332 A1 | 5/2019 | Bertness |
| 2020/0251706 A1* | 8/2020 | Tevene' .................. A62C 3/10 |

FOREIGN PATENT DOCUMENTS

| | | |
|---|---|---|
| JP | 2005-322471 A | 11/2005 |
| JP | 2007-265658 A | 10/2007 |
| JP | 2008-41509 A | 2/2008 |
| JP | 2009-303364 A | 12/2009 |
| JP | 2011-23302 A | 2/2011 |
| JP | 2015-44454 A | 3/2015 |
| JP | 2018-101502 A | 6/2018 |
| JP | 2019-67470 A | 4/2019 |
| KR | 10-2011-0077774 A | 7/2011 |
| KR | 10-2012-0042966 A | 5/2012 |
| KR | 10-2012-0108260 A | 10/2012 |
| KR | 10-2013-0042088 A | 4/2013 |
| KR | 10-2014-0051704 A | 6/2014 |
| KR | 10-2016-0104867 A | 9/2016 |
| KR | 10-2013-0028023 A | 3/2018 |
| WO | WO 2011/101942 A1 | 8/2011 |
| WO | WO 2012/014449 A1 | 2/2012 |

OTHER PUBLICATIONS

Extended European Search Report for European Application No. 20844124.6, dated Mar. 1, 2022.

* cited by examiner

[FIG. 1]

Conventional Art

VEHICLE BATTERY FIRE SENSING APPARATUS AND METHOD

TECHNICAL FIELD

This application claims the benefit of priority to Korean Patent Application No. 2019-0089225 filed on Jul. 23, 2019, the disclosure of which is hereby incorporated by reference herein its entirety.

The present invention relates to a vehicle battery fire sensing apparatus and method, and more particularly to a vehicle battery fire sensing apparatus configured such that a sensor configured to measure the temperature and pressure of gas discharged from a gas discharge portion of a battery pack is provided at a vehicle structure, and therefore, when fire breaks out in a battery pack case, it is possible to rapidly and accurately inform a passenger of the same, and a vehicle battery fire sensing method.

BACKGROUND ART

With technological development of mobile devices, such as mobile phones, laptop computers, camcorders, and digital cameras, and an increase in the demand therefor, research on secondary batteries, which are capable of being charged and discharged, has been actively conducted.

In addition, secondary batteries, which are energy sources substituting fossil fuels causing air pollution, have been applied to an electric vehicle (EV), a hybrid electric vehicle (HEV), and a plug-in hybrid electric vehicle (P-HEV), and therefore there is an increasing necessity for development of secondary batteries.

There are a nickel-cadmium battery, a nickel-hydride battery, a nickel-zinc battery, and a lithium secondary battery as currently commercialized secondary batteries. Thereamong, the lithium secondary battery is in the spotlight, since the lithium secondary battery has little memory effect, whereby the lithium secondary battery is capable of freely discharged, has a very low self-discharge rate, and has high energy density, compared to the nickel-based secondary batteries.

Meanwhile, heat is generated from the lithium secondary battery when the lithium secondary battery is charged and discharged. In the case in which the heat is not effectively removed but is accumulated, degradation of the battery may occur, and the safety of the battery may also be greatly reduced. Particularly, in a battery that requires high-speed charging and discharging characteristics, like a power source for an electric vehicle, a hybrid electric vehicle, etc., generation of a large amount of heat and expansion in volume of the battery occur during a process of instantaneously providing high output.

FIG. 1 is a schematic view of a conventional vehicle battery fire sensing apparatus. Referring to FIG. 1, in the conventional vehicle battery fire sensing apparatus, a battery pack 200, which includes a battery module 210, a battery management system (BMS) 220 configured to overall control the charging and discharging operation of a battery, and a battery pack case 230 configured to receive the battery module and the battery management system, is fixed to a vehicle structure 100. In addition, a gas discharge portion 231 configured to allow gas or pressure to be discharged therethrough when fire breaks out or thermal runaway occurs in the battery pack is mounted at the battery pack case 230.

In the conventional vehicle battery fire sensing apparatus, described above, the temperature or voltage of a battery cell is sensed, and, upon determining that the battery cell is in an abnormal state, the result of determination is transmitted to an electronic control unit 300. That is, information related to the battery module 210 and the battery management system (BMS) 220 is transmitted to the electronic control unit 300 via a first connector 110, a fifth connector 310, and a first communication means 410.

In the case in which fire breaks out in the battery pack, however, a temperature sensor (not shown) or a voltage sensor (not shown) may be damaged, whereby it is not possible to accurately sense the state of the battery. Furthermore, in the case in which fire breaks out in the vicinity of the battery management system, the battery management system may not be properly operated, whereby protection measures for a passenger may not be properly taken.

As a conventional art for solving the above problem, Korean Patent Application Publication No. 2013-0028023 discloses a battery pack fire suppression apparatus capable of suppressing fire in a battery pack. In this conventional art, however, a tank configured to store a fire extinguishing agent is further formed, whereby space utilization is deteriorated. In addition, an increase in weight of the battery pack fire suppression apparatus due to the addition of the tank adversely affects fuel economy of a vehicle.

In addition, Korean Patent Application Publication No. 2014-0051704 discloses a battery pack protection apparatus and a battery pack including the same. In this prior art document, a measurement IC is connected to opposite ends of a battery cell to measure voltage of the battery cell and thus to measure the magnitude of current that flows in a power supply path, and whether the measurement IC is abnormal is determined based on the measured magnitude of current. However, the measurement IC, which is a part configured to measure battery voltage, temperature, current, etc. in a battery management system (BMS), may be easily damaged due to fire or thermal runaway, and therefore there is a limitation in fundamentally solving the problem.

GB standards (Chinese national standards on the safety of electric vehicle batteries, which are expected to be enforced in July of 2020) and EVS-GTR (Global Technical Regulation on Electric Vehicle Safety), which will be established and enforced within a few years, require that a vehicle warn a passenger of danger 5 minutes before danger occurs in a passenger space due to thermal diffusion caused by thermal runaway or fire of a battery as compulsory regulations.

However, in the case in which the BMS is damaged and thus the function of the BMS is lost, as described above, it is not possible to warn the passenger of danger. Therefore, there is an urgent necessity for development of technology related thereto.

Prior Art Documents (Patent Document 1) Korean Patent Application Publication No. 2013-0028023

(Patent Document 2) Korean Patent Application Publication No. 2014-0051704

DISCLOSURE

Technical Problem

The present invention has been made in view of the above problems, and it is an object of the present invention to provide a vehicle battery fire sensing apparatus and method capable of, when fire breaks out in a battery pack, reliably sensing the same and informing a passenger of the same.

It is another object of the present invention to provide a vehicle battery fire sensing apparatus and method capable of accurately sensing the situation in a battery pack while minimizing an increase in weight of a vehicle.

Technical Solution

In order to accomplish the above object, a vehicle battery fire sensing apparatus according to the present invention includes a battery pack (200) mounted to a vehicle structure and an electronic control unit (300), wherein the battery pack (200) includes a battery module (210) including one or more battery cells, a battery management system configured to transmit a signal received from the battery module (210) to the electronic control unit (300), and a battery pack case (230) having a gas discharge portion (231) configured to allow venting gas to be discharged therethrough, and a sensor provided at the vehicle structure and spaced from the battery pack case, the sensor being configured to measure at least one of the temperature or pressure of the gas discharged from the gas discharge portion (231).

Also, in the vehicle battery fire sensing apparatus according to present invention, the sensor may be a first temperature sensor (120), and the vehicle battery fire sensing apparatus may further includes a second communication means (420) having a first side connected to the first temperature sensor (120) and a second side connected to the electronic control unit (300).

Also, in the vehicle battery fire sensing apparatus according to present invention, the sensor may be a first pressure sensor (140), and the vehicle battery fire sensing apparatus may further include a fourth communication means (440) having a first side connected to the first pressure sensor (140) and a second side connected to the electronic control unit (300).

Also, the vehicle battery fire sensing apparatus according to present invention may further include a second temperature sensor (130) located at a position spaced apart from the first temperature sensor (120) by a predetermined distance and a third communication means (430) having a first side connected to the second temperature sensor (130) and a second side connected to the electronic control unit (300).

Also, the vehicle battery fire sensing apparatus according to present invention may further include a second pressure sensor (150) located at a position spaced apart from the first pressure sensor (140) by a predetermined distance and a fifth communication means (450) having a first side connected to the second pressure sensor (150) and a second side connected to the electronic control unit (300).

Also, the vehicle battery fire sensing apparatus according to present invention may include a first pressure sensor, and the first temperature sensor (120) and the first pressure sensor (140) may be located adjacent to each other.

Also, in the vehicle battery fire sensing apparatus according to present invention, the gas discharge portion may be at least one of a Gore-Tex membrane or a rupture disk configured to be ruptured when the pressure is equal to or higher than a predetermined pressure.

In addition, a vehicle battery fire sensing method according to the present invention includes a first step of measuring at least one of a temperature or voltage of a battery module, a second step of transmitting a first measurement value in the first step to an electronic control unit (ECU), a third step of the electronic control unit (ECU) receiving the first measurement value and determining whether the received first measurement value is within a normal range, returning to the first step when the first measurement value received by the electronic control unit (ECU) is within the normal range, a fourth step of transmitting a second measurement value of the temperature or pressure of the vehicle structure to the electronic control unit (ECU) in the case in which the electronic control unit (ECU) does not receive the first measurement value or the received first measurement value deviates from the normal range, and a fifth step of the electronic control unit (ECU) determining whether the received second measurement value of the vehicle structure is within a normal range and transmitting a notification signal.

Also, in the vehicle battery fire sensing method according to present invention, the measurement value in the fourth step may be a first temperature and may be transmitted to the ECU via a second communication means.

Also, in the vehicle battery fire sensing method according to present invention, the second measurement value in the fourth step may be a first pressure and may be transmitted to the ECU via a fourth communication means.

Also, in the vehicle battery fire sensing method according to present invention, the second measurement value in the fourth step may include a first temperature, transmitted via a second communication means, and a second temperature, transmitted via a third communication means.

Also, the vehicle battery fire sensing method according to present invention may further include determining whether the second measurement value in the fifth step is within the normal range based on the difference between the first temperature and the second temperature.

Also, in the vehicle battery fire sensing method according to present invention, the second measurement value in the fourth step may include a first pressure, transmitted via a fourth communication means, and a second pressure, transmitted via a fifth communication means.

Also, the vehicle battery fire sensing method according to present invention may further include determining whether the second measurement value in the fifth step is within the normal range based on the difference between the first pressure and the second pressure.

Advantageous Effects

In a vehicle battery fire sensing apparatus and method according to the present invention, a sensor configured to measure the temperature and pressure of gas discharged from a gas discharge portion of a battery pack is provided at a vehicle structure, and therefore it is possible to rapidly transmit a signal indicating whether fire breaks out to an electronic control unit even in the case in which a battery management system or sensors are damaged due to fire breaking out in a battery pack case.

Also, in the vehicle battery fire sensing apparatus and method according to the present invention, only sensors and communication means are added, whereby it is possible to secure the safety of a passenger in an emergency while minimizing an increase in weight of a vehicle.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

A vehicle battery fire sensing apparatus and method according to the present invention will be described in detail with reference to the accompanying drawings.

Figure 1:
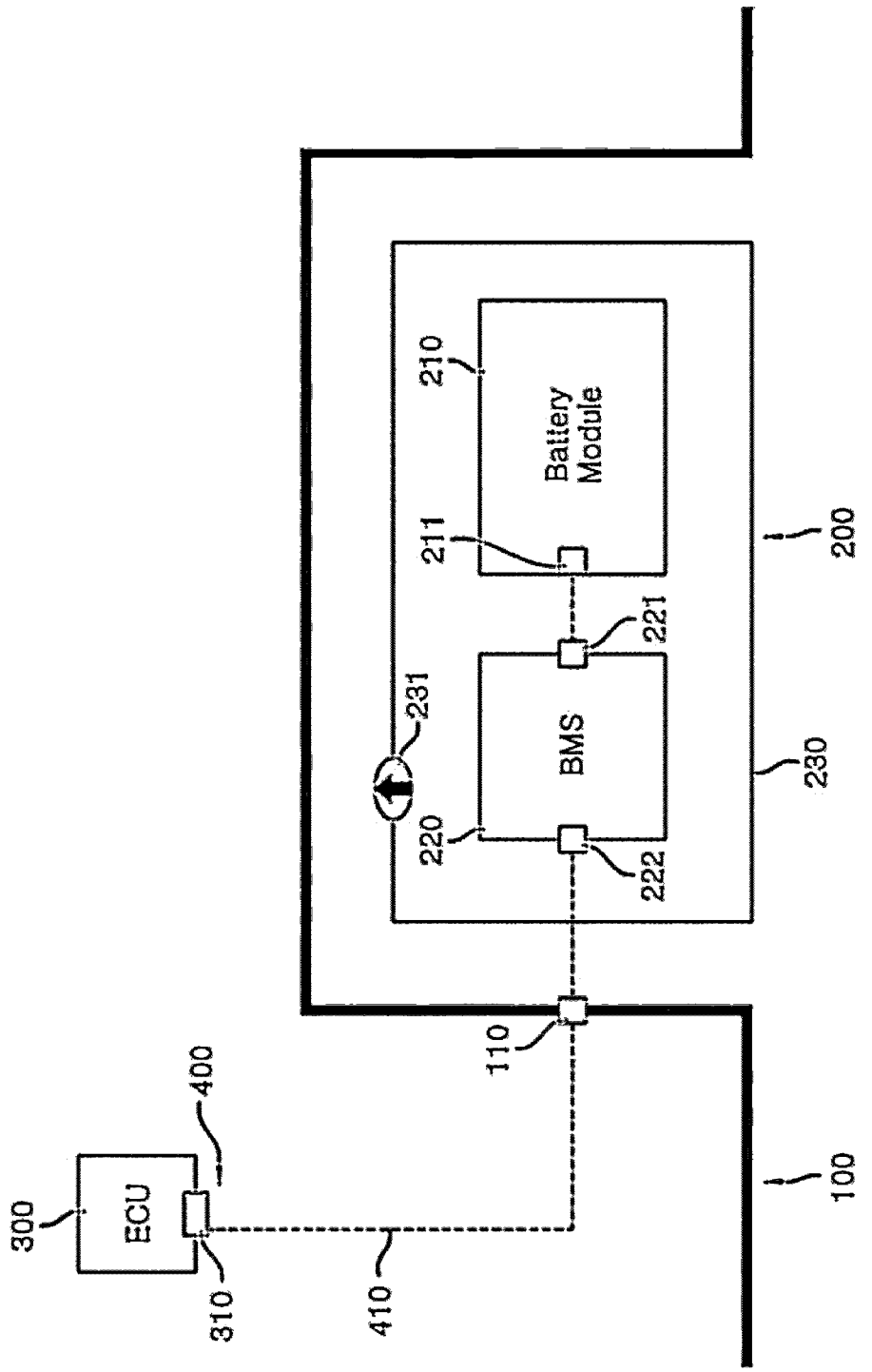
FIG. 1 is a schematic view of a conventional vehicle battery fire sensing apparatus.
Figure 2:
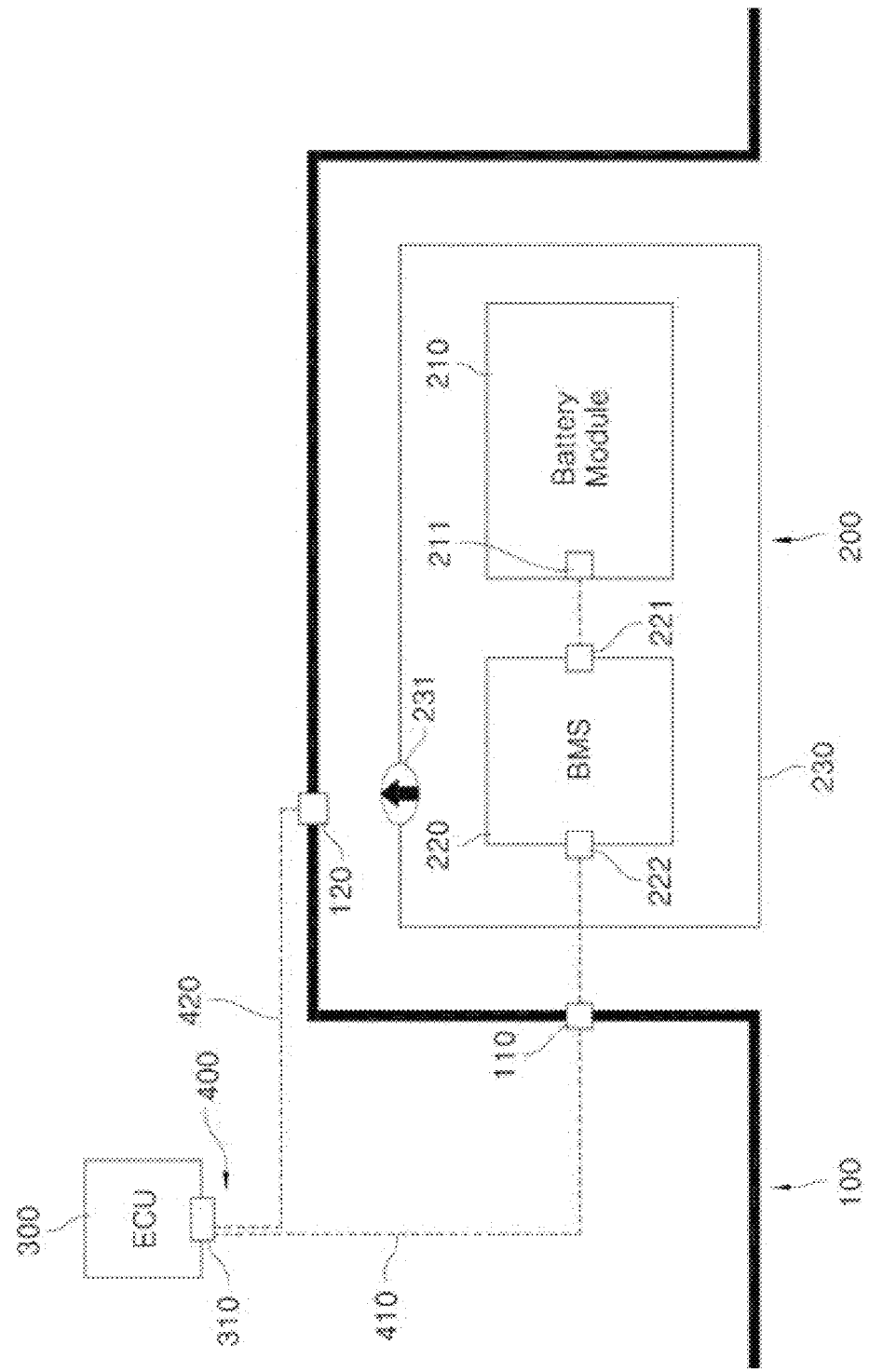
FIG. 2 is a schematic view of a vehicle battery fire sensing apparatus according to a first preferred embodiment of the present invention.

FIG. 2 is a schematic view of a vehicle battery fire sensing apparatus according to a first preferred embodiment of the present invention.

Referring to FIG. 2, the vehicle battery fire sensing apparatus according to the first preferred embodiment of the present invention includes a vehicle structure 100, a battery pack 200, an electronic control unit 300, and a communication means 400.

The vehicle structure 100 is not particularly restricted as long as the battery pack 200 is fixedly mounted to the vehicle structure 100. As an example, the vehicle structure may be a vehicle body.

The battery pack 200 includes a battery module 210, a battery management system 220, and a battery pack case 230.

The battery module 210 includes a cell assembly, wherein the cell assembly may be a jelly-roll type cell assembly configured to have a structure in which a long-sheet type positive electrode and a long-sheet type negative electrode are wound in the state in which a separator is interposed therebetween, a stacked type cell assembly including unit cells, each of which is configured to have a structure in which a rectangular positive electrode and a rectangular negative electrode are stacked in the state in which a separator is interposed therebetween, a stacked and folded type cell assembly configured to have a structure in which the unit cells are wound using a long separation film, or a laminated and stacked type cell assembly configured to have a structure in which the unit cells are stacked in the state in which a separator is interposed therebetween and are then attached to each other. However, the present invention is not limited thereto.

The cell assembly is mounted in a case, wherein the case is generally configured to have a laminate sheet structure including an inner layer, a metal layer, and an outer layer. The inner layer directly contacts the cell assembly, whereby the inner layer must exhibit high insulation properties and high resistance to an electrolytic solution. In addition, the inner layer must exhibit high sealability in order to hermetically seal the case from the outside, i.e. a thermally-bonded sealed portion between inner layers must exhibit excellent thermal bonding strength. The inner layer may be made of a material selected from among a polyolefin-based resin, such as polypropylene, polyethylene, polyethylene-acrylic acid, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and resistance to impact strength, and excellent chemical resistance, is the most preferably used.

The metal layer, which abuts the inner layer, corresponds to a barrier layer configured to prevent moisture or various kinds of gas from permeating into the battery from the outside. Aluminum foil, which is light and easily formable, may be used as a preferred material of the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the cell assembly. As an example, the outer layer may be made of nylon or polyethylene terephthalate. However, the present invention is not limited thereto.

Meanwhile, leads, i.e. a positive electrode lead and a negative electrode lead, are exposed out of the case after being electrically connected to a positive electrode tab and a negative electrode tab of the cell assembly, respectively. The battery cell described above corresponds to a generally known construction, and therefore a more detailed description thereof will be omitted.

Meanwhile, a second connector 211 is provided at one side of the battery module 210, and a third connector 221 and a fourth connector 222 are provided at opposite sides of the battery management system 220. These connectors are electrically connected to a first communication means 410, a description of which will follow, to transmit the state of the battery module 210 to the electronic control unit 300.

The battery management system 220, which generally controls and manages the battery, such as charging and discharging of the battery, has already described above, and a detailed description thereof will be omitted.

The battery pack case 230 is configured to receive and fix the battery module 210 and the battery management system 220, and a gas discharge portion 231 is provided at a predetermined position of the battery pack case.

In general, a secondary battery is charged and discharged through repeated processes of intercalation and deintercalation of lithium ions in a lithium metal oxide of a positive electrode into and from a graphite electrode of a negative electrode. However, heat is generated and an electrolyte is decomposed by internal short circuit, overcharge, and overdischarge due to external impact, with the result that high-temperature, high-pressure gas is generated.

The gas discharge potion 231 is configured to rapidly discharge high-temperature, high-pressure gas generated in the battery pack case 230 and thus prevent explosion of the battery pack case.

As an example, the gas discharge potion may be a rupture disk configured to completely isolate the inside of the battery pack case 230 from the outside when the battery module 210 is normally operated and to be ruptured only in an emergency, e.g. when pressure increases to a predetermined level or higher, or may be made of a Gore-Tex membrane material, which is a selective and breathable material, in consideration of the fact that a small amount of gas or moisture may be generated even when the battery module 210 is normally operated. Of course, even in the case in which the gas discharge potion is made of a Gore-Tex membrane material, it is obvious that the gas discharge potion may be torn in order to prevent explosion of the battery pack case 230 when pressure in the battery pack case abnormally increases.

Meanwhile, it is preferable that a first temperature sensor 120 be provided at the vehicle structure 100 and that the first temperature sensor 120 and the electronic control unit 300 be connected to each other via a second communication means 420.

Specifically, it is preferable that the first temperature sensor 120 mounted at the vehicle structure 100 be provided at a position close to the gas discharge portion 231 in order to rapidly measure the temperature of gas generated from the gas discharge portion 231. For example, it is preferable that the first temperature sensor 120 be located so as to be spaced apart from the gas discharge portion 231 by about 5 to 50 mm in order to sense meaningful temperature within 5 minutes in consideration of the GB standards and EVS-GTR described above.

Since one side of the second communication means 420 is connected to the first temperature sensor 120 and the other side of the second communication means is connected to the electronic control unit 300, it is possible to check the temperature of gas discharged from the gas discharge portion 231 not via the battery management system 220.

Here, the second communication means 420 is not particularly restricted as long as the second communication means is capable of transmitting a measurement value of the first temperature sensor 120 to the electronic control unit 300.

In a conventional case, a method of transmitting a signal to the electronic control unit via the battery management system when the battery module catches fire was used. In the case in which a sensing part, such as a harness, or the battery management system itself is damaged by sudden fire, however, it was not possible to recognize the situation in the battery pack at all.

According to the first embodiment of the present invention, however, the first temperature sensor 120 is installed at the vehicle structure 100 spaced apart from the battery pack case by a predetermined distance, whereby it is possible to rapidly transmit information to the electronic control unit even when the sensing part in the battery pack case or the battery management system itself catches fire.

Figure 3:
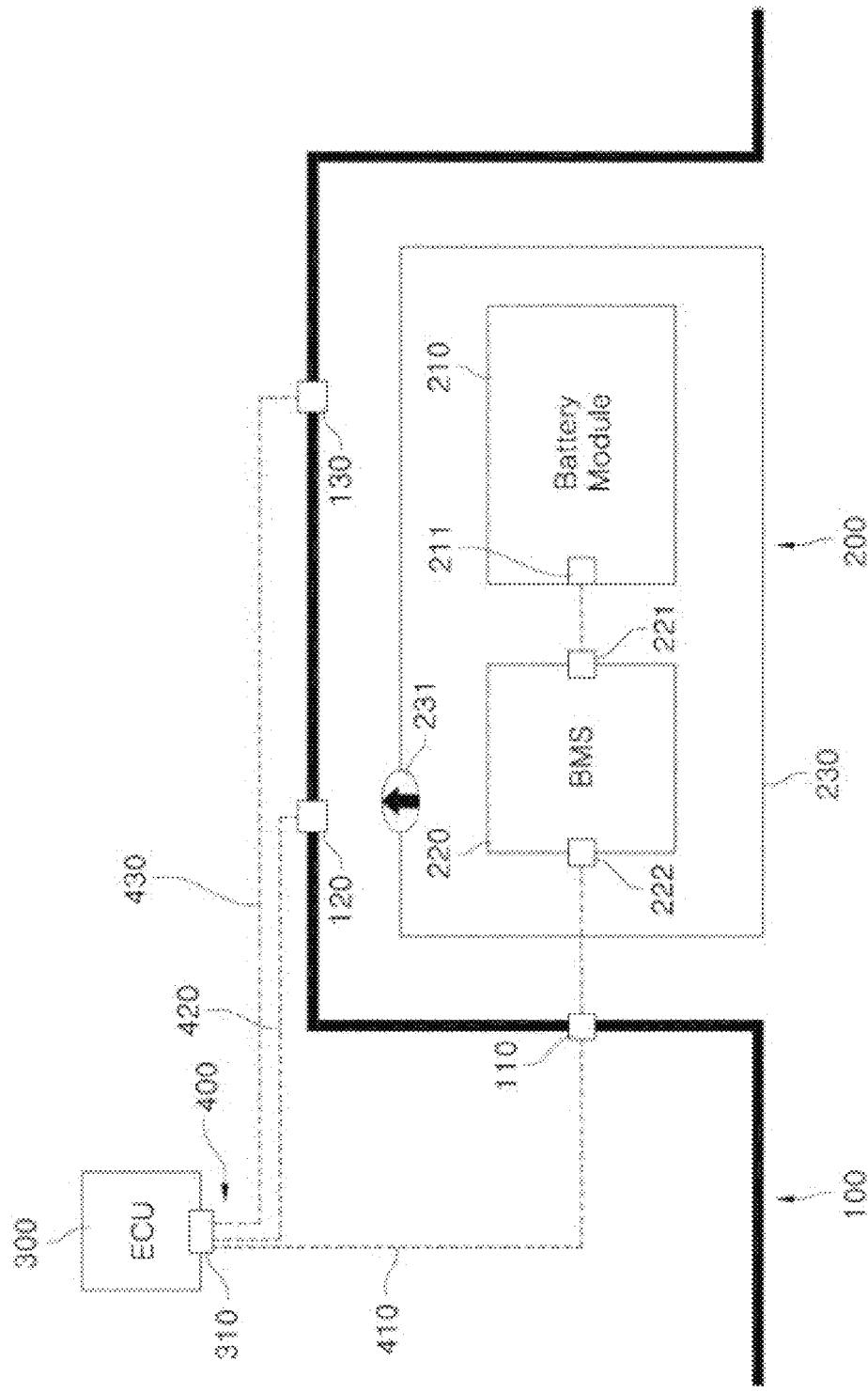
FIG. 3 is a schematic view of a vehicle battery fire sensing apparatus according to a second preferred embodiment of the present invention.

FIG. 3 is a schematic view of a vehicle battery fire sensing apparatus according to a second preferred embodiment of the present invention.

The second embodiment is identical to the first embodiment described with reference to FIG. 2 except that a second temperature sensor 130 and a third communication means 430 are further provided. Hereinafter, therefore, a description will be given of only the second temperature sensor 130 and the third communication means 430, which are further provided.

In the second preferred embodiment of the present invention, the second temperature sensor 130 is located at a position spaced apart from the first temperature sensor 120 by a predetermined distance. In addition, the third communication means 430, one side of which is connected to the second temperature sensor 130 and the other side of which is connected to the electronic control unit 300, is further provided.

Figure 4:
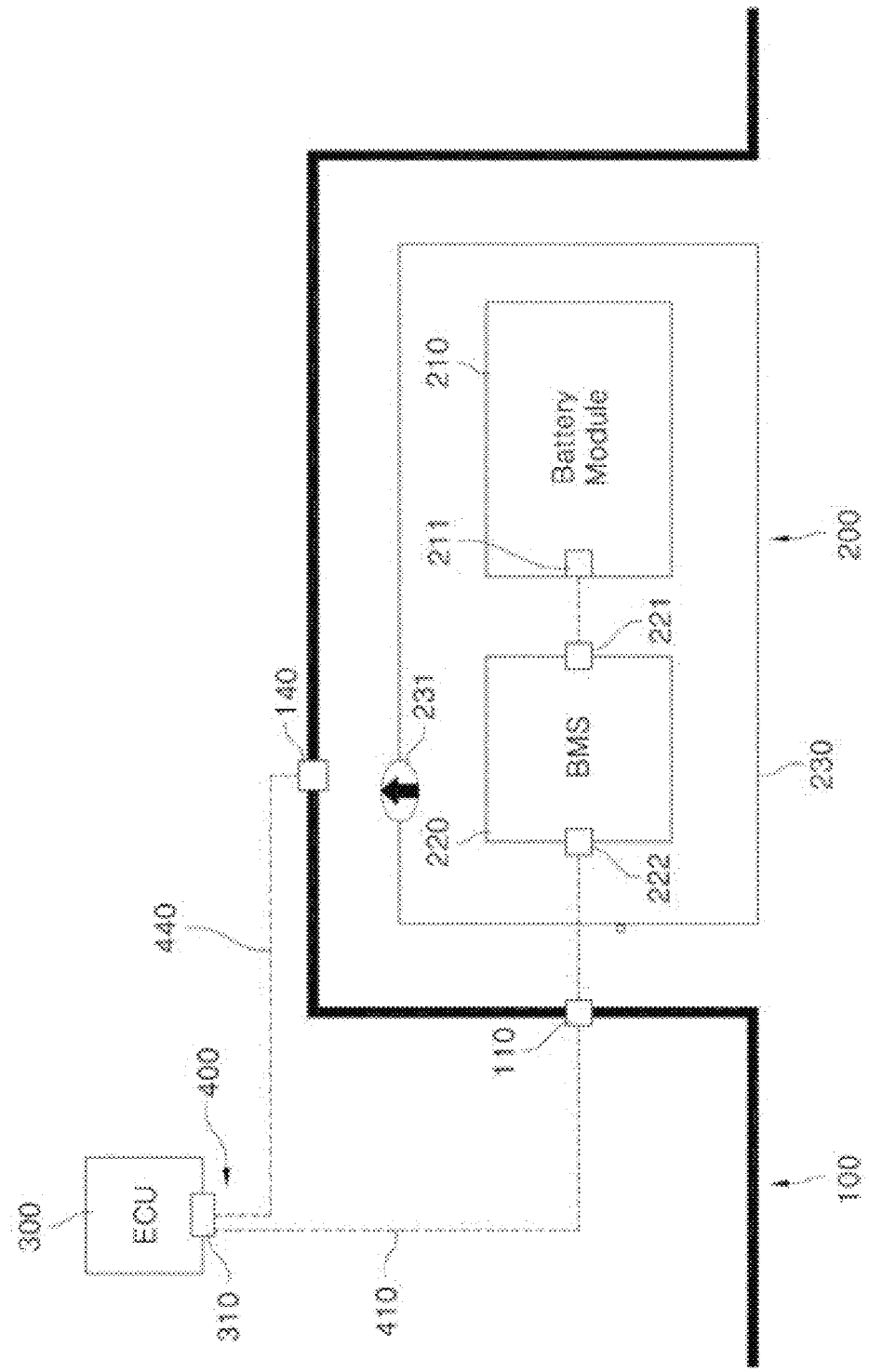
FIG. 4 is a schematic view of a vehicle battery fire sensing apparatus according to a third preferred embodiment of the present invention.

FIG. 4 is a schematic view of a vehicle battery fire sensing apparatus according to a third preferred embodiment of the present invention.

The third embodiment is identical to the first embodiment described with reference to FIG. 2 except that a first pressure sensor 140 and a fourth communication means 440 are provided instead of the first temperature sensor 120 and the second communication means 420. Hereinafter, therefore, a description will be given of only the first pressure sensor 140 and the fourth communication means 440.

In the third preferred embodiment of the present invention, the first pressure sensor 140 is provided at the vehicle structure 100, and the fourth communication means 440 is connected between the first pressure sensor 140 and the electronic control unit 300.

Specifically, it is preferable that the first pressure sensor 140 mounted at the vehicle structure 100 be provided at a position close to the gas discharge portion 231 in order to rapidly measure the pressure of gas generated from the gas discharge portion 231, for example, the first pressure sensor be located so as to be spaced apart from the gas discharge portion 231 by about 5 to 50 mm, in the same manner as the first temperature sensor 120.

Since one side of the fourth communication means 440 is connected to the first pressure sensor 140 and the other side of the fourth communication means is connected to the electronic control unit 300, it is possible to check the pressure of gas discharged from the gas discharge portion 231 not via the battery management system 220.

Figure 5:
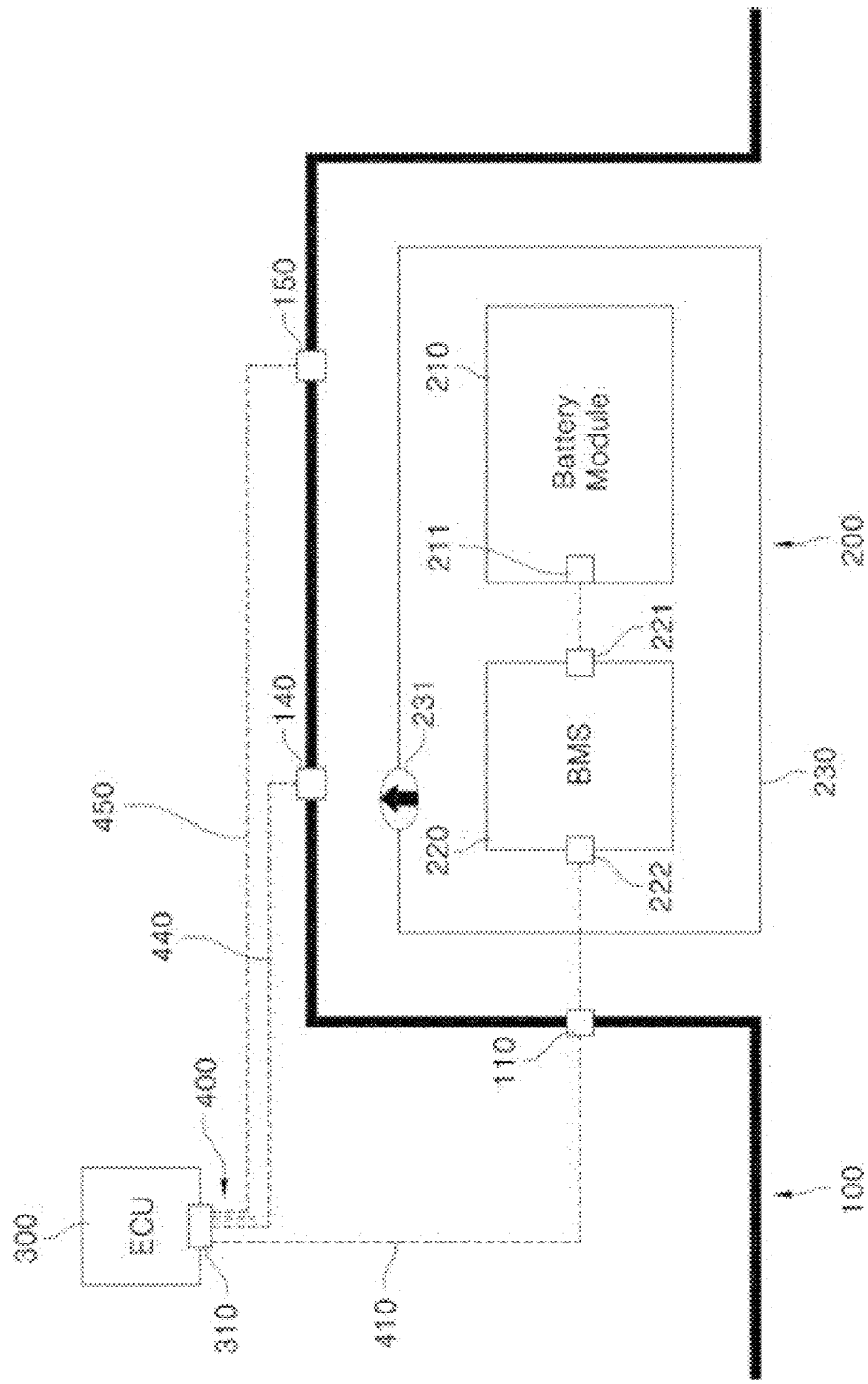
FIG. 5 is a schematic view of a vehicle battery fire sensing apparatus according to a fourth preferred embodiment of the present invention.

FIG. 5 is a schematic view of a vehicle battery fire sensing apparatus according to a fourth preferred embodiment of the present invention.

The fourth embodiment is identical to the third embodiment described with reference to FIG. 4 except that a second pressure sensor 150 and a fifth communication means 450 are further provided. Hereinafter, therefore, a description will be given of only the second pressure sensor 150 and the fifth communication means 450, which are further provided.

In the fourth preferred embodiment of the present invention, the second pressure sensor 150 is located at a position spaced apart from the first pressure sensor 140 by a predetermined distance. In addition, the fifth communication means 450, one side of which is connected to the second pressure sensor 150 and the other side of which is connected to the electronic control unit 300, is further provided.

Figure 6:
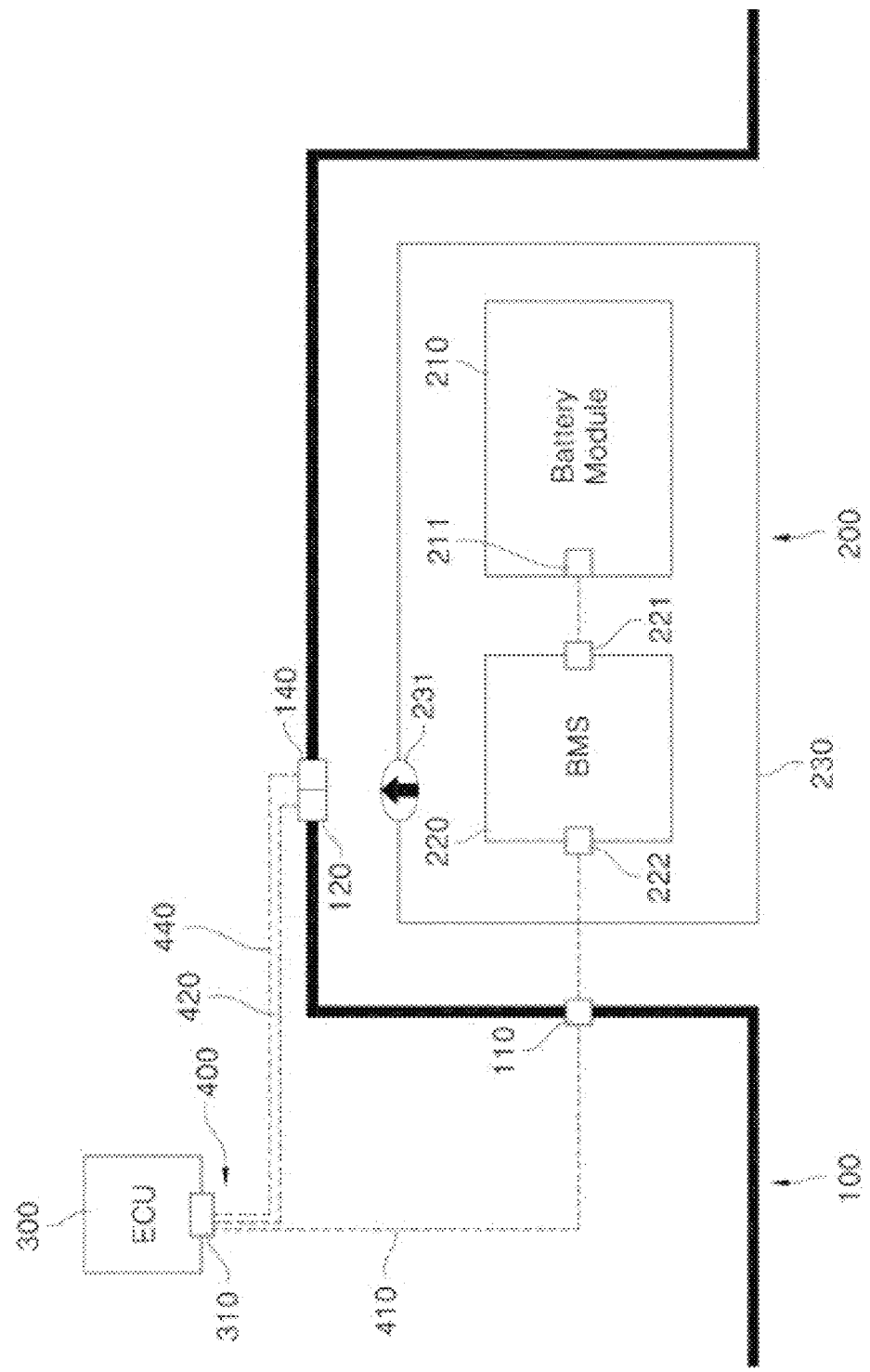
FIG. 6 is a schematic view of a vehicle battery fire sensing apparatus according to a fifth preferred embodiment of the present invention.

FIG. 6 is a schematic view of a vehicle battery fire sensing apparatus according to a fifth preferred embodiment of the present invention.

The fifth embodiment is identical to the first embodiment described with reference to FIG. 2 except that a first pressure sensor 140 and a fourth communication means 440 are further provided. Hereinafter, therefore, a description will be given of only the first pressure sensor 140 and the fourth communication means 440, which are further provided.

In the fifth preferred embodiment of the present invention, the first pressure sensor 140 is provided together with the first temperature sensor 120. In addition, the fourth communication means 440, one side of which is connected to the first pressure sensor 140 and the other side of which is connected to the electronic control unit 300, is further provided.

Here, the first temperature sensor 120 and the first pressure sensor 140 are located adjacent to each other in order to rapidly measure the temperature and pressure of gas generated from the gas discharge portion 231, respectively. In addition, the first temperature sensor and the first pressure sensor are installed close to the gas discharge portion 231.

According to the fifth embodiment of the present invention, as described above, the first temperature sensor 120 and the first pressure sensor 140 are installed together at the vehicle structure 100 spaced apart from the battery pack case by a predetermined distance, whereby it is possible to rapidly transmit information to the electronic control unit even when the sensing part in the battery pack case or the battery management system itself catches fire. In addition, it is possible to transmit both temperature information and pressure information, whereby it is possible to more accurately check the state of the battery pack case.

Figure 7:
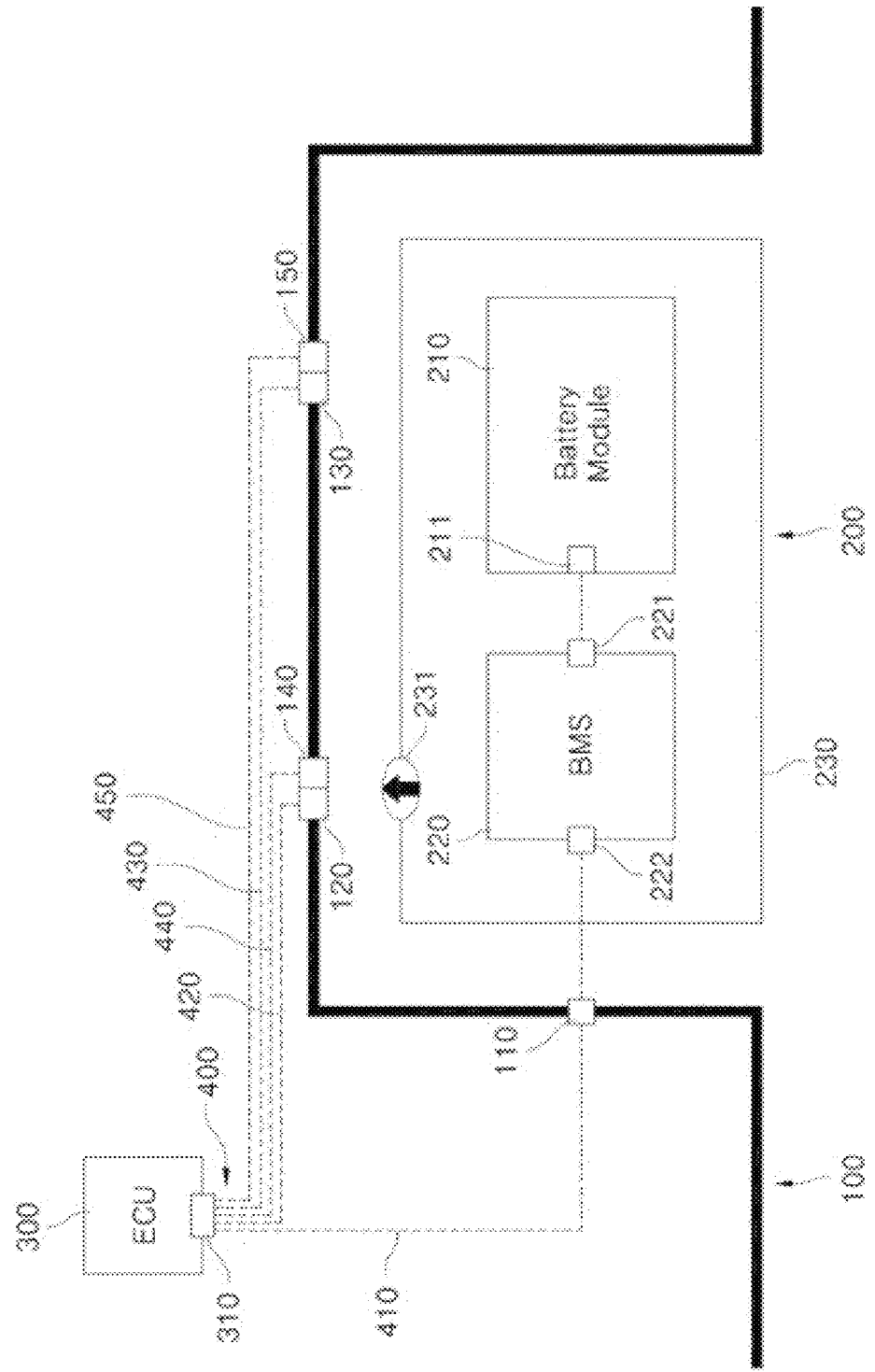
FIG. 7 is a schematic view of a vehicle battery fire sensing apparatus according to a sixth preferred embodiment of the present invention.

FIG. 7 is a schematic view of a vehicle battery fire sensing apparatus according to a sixth preferred embodiment of the present invention.

The sixth preferred embodiment of the present invention includes all of the constructions of the second embodiment described with reference to FIG. 3, the fourth embodiment described with reference to FIG. 5, and the fifth embodiment described with reference to FIG. 6.

That is, a first temperature sensor 120 and a first pressure sensor 140 capable of simultaneously measuring both the temperature and pressure of gas generated from a gas discharge portion 231 is located at a vehicle structure so as to be close to the gas discharge portion 231, and a second communication means 420 and a fourth communication means 440, configured to transmit measurement values of the first temperature sensor and the first pressure sensor to an electronic control unit 300, are connected to the first temperature sensor and the first pressure sensor, respectively. In addition, a second temperature sensor 130 and a second pressure sensor 150 are provided at positions spaced apart from the first temperature sensor 120 and the first pressure sensor 140 by predetermined distances, and a third communication means 430 and a fifth communication means 450 are provided correspondingly.

Hereinafter, a sensing method using the vehicle battery fire sensing apparatus according to any one of the first to sixth embodiments described above will be described in detail.

Figure 8:
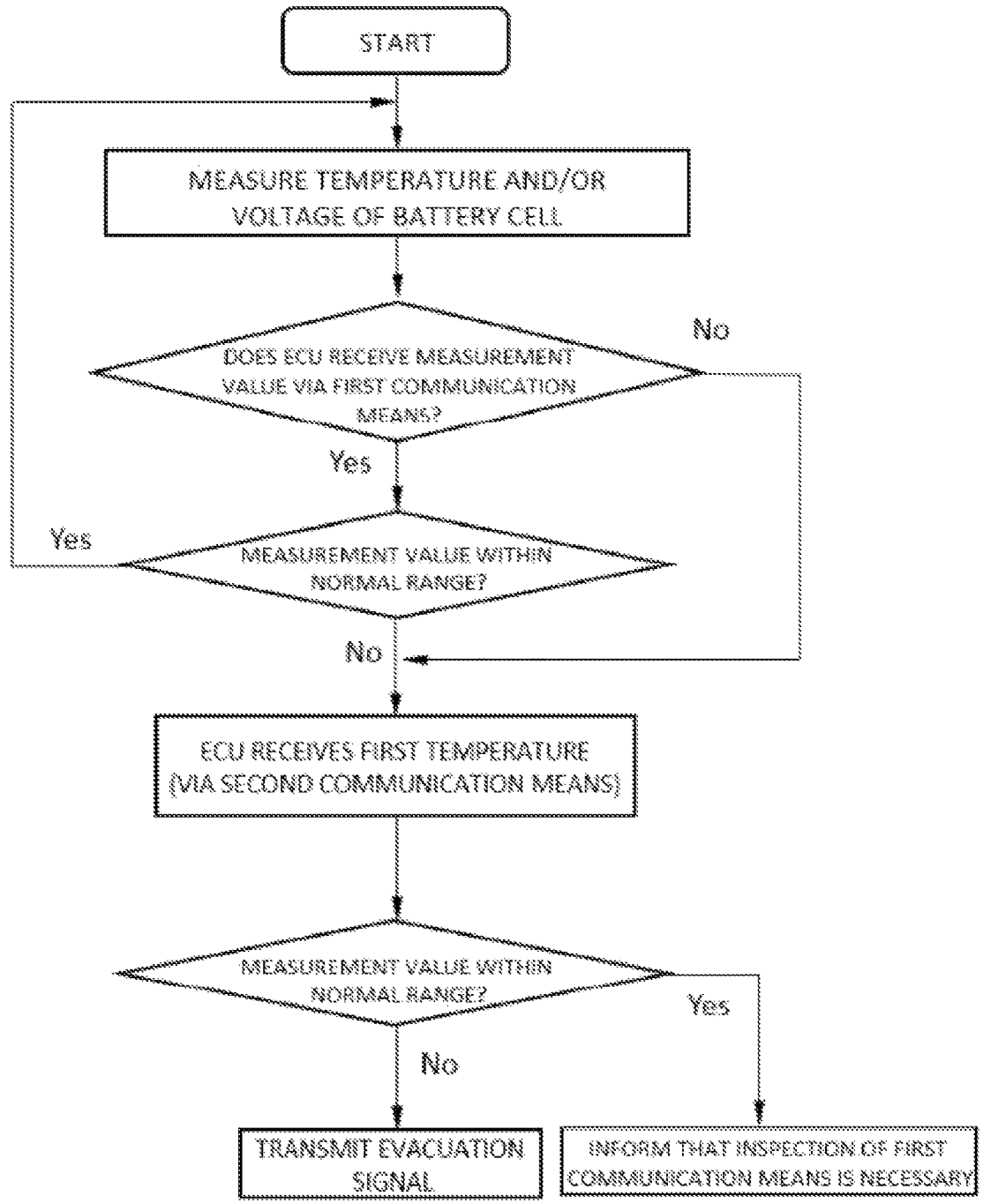
FIG. 8 is an algorithm illustrating a sensing method using the vehicle battery fire sensing apparatus according to the first preferred embodiment of the present invention.

FIG. 8 is an algorithm illustrating a sensing method using the vehicle battery fire sensing apparatus according to the first preferred embodiment of the present invention.

The sensing method may include a first step of measuring at least one of the temperature or voltage of the battery cell, a second step of transmitting a measurement value in the first step to the ECU via the first communication means, a third step of the ECU receiving the measurement value and determining whether the received measurement value is within a normal range, a fourth step of transmitting a first temperature value to the ECU via the second communication means in the case in which the third step is not satisfied, and a fifth step of determining whether the received first temperature value is within a normal range and transmitting a notification signal.

Specifically, the first step is a step of continuously or discontinuously measuring the temperature and voltage of the battery cell received in the battery pack case. Here, only the temperature or voltage of the battery cell may be measured. However, it is preferable that both the temperature and voltage of the battery cell be measured in order to more accurately check the state of the battery cell.

The second step is a step of transmitting the temperature and/or the voltage measured in the first step, i.e. information about the battery module and the BMS, to the ECU via the first communication means, which directly connects the battery module and the BMS to the ECU.

The third step is a step of determining whether the ECU properly receives the transmitted temperature and/or voltage measurement value or whether the received measurement value is within a predetermined normal range. In the case in which the ECU normally receives the temperature and/or voltage measurement value and the received measurement value is within the normal range, the first step of continuously or discontinuously measuring the temperature and voltage of the battery cell and the second step are repeatedly performed.

The fourth step is a step of transmitting a first temperature value to the ECU via the second communication means in the case in which the ECU does not receive the temperature and/or voltage measurement value or in the case in which, although the measurement value is received, the received measurement value deviates from the normal range.

The reason that the ECU does not properly receive the temperature and/or voltage measurement value is that the first communication means is not properly operated due to various causes in the battery pack, such as fire or heat, and in the case in which, although the measurement value is received, the received measurement value deviates from the normal range, there is a high possibility of the emergency described above being imminent. Consequently, the first temperature value is transmitted to the ECU via the second communication means, which is separated from the battery pack.

The fifth step is a step of determining the situation in the battery pack based on the first temperature value transmitted via the second communication means. In the case in which the first temperature value is within a normal range, simple physical short circuit of the first communication means is expected, and therefore a driver is informed that inspection is necessary through a display device of a vehicle. In the case in which the first temperature value is within an abnormal range, on the other hand, there is a strong possibility of the battery pack overheating or catching fire, and therefore the driver is informed that it is necessary to rapidly evacuate the vehicle.

Figure 9:
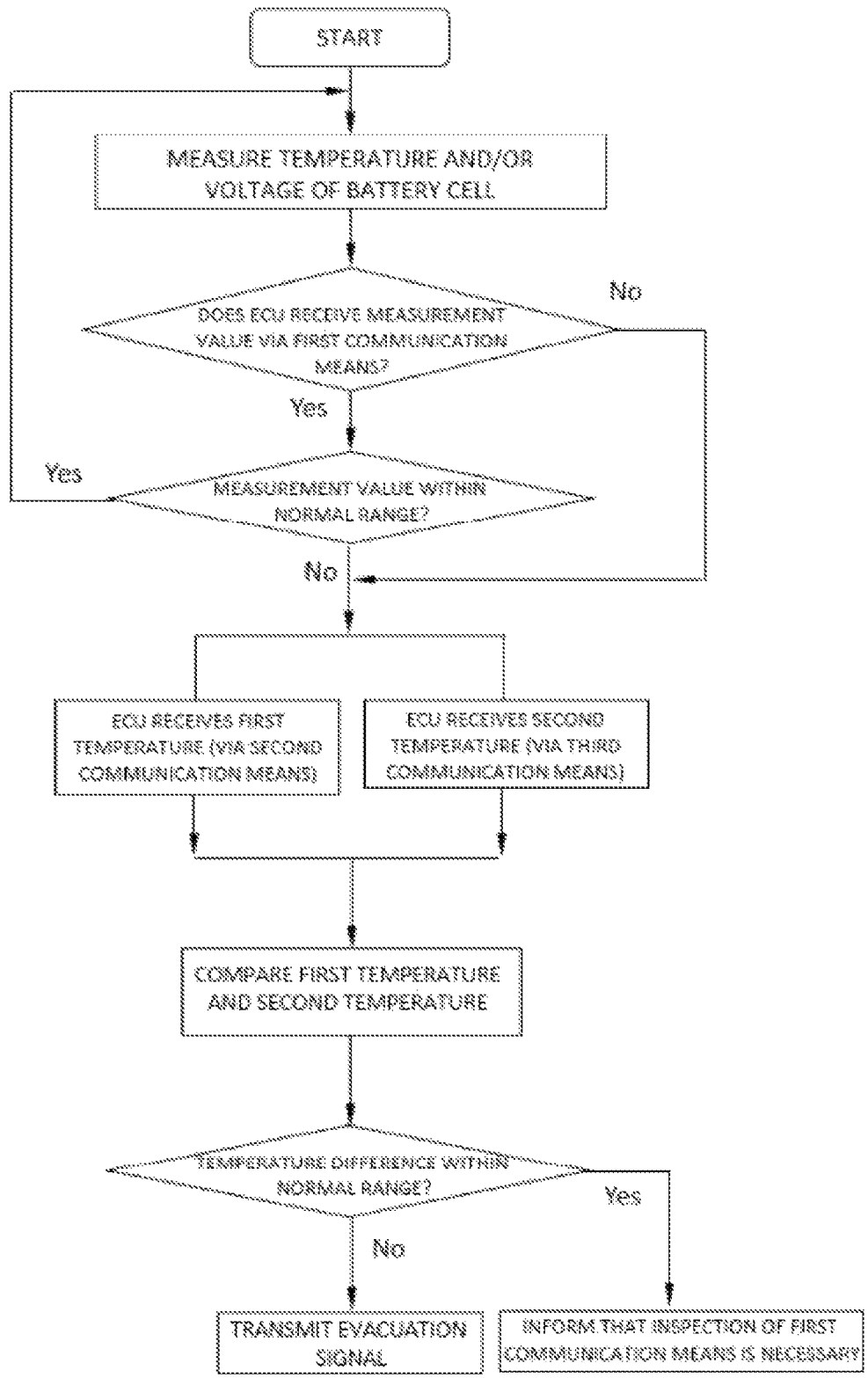
FIG. 9 is an algorithm illustrating a sensing method using the vehicle battery fire sensing apparatus according to the second preferred embodiment of the present invention.

FIG. 9 is an algorithm illustrating a sensing method using the vehicle battery fire sensing apparatus according to the second preferred embodiment of the present invention.

A first step to a third step are identical to those of the sensing method described with reference to FIG. 8. Hereinafter, therefore, a description of the first step to the third step will be omitted, and only different constructions will be described.

The sensing method may include a fourth step of transmitting a first temperature value and a second temperature value to the ECU via the second communication means and the third communication means, respectively, in the case in which the third step is not satisfied, and a fifth step of comparing the received first temperature value and the received second temperature value with each other, determining whether the received first temperature value and the received second temperature value are within a normal range, and transmitting a notification signal.

Specifically, the fourth step is a step of transmitting a first temperature value to the ECU via the second communication means and transmitting a second temperature value to the ECU via the third communication means in the case in which the ECU does not receive the temperature and/or voltage measurement value or in the case in which, although the measurement value is received, the received measurement value deviates from the normal range.

The fifth step is a step of determining the situation in the battery pack based on the difference between the first temperature value and the second temperature value transmitted via the second communication means and the third communication means. That is, in the case in which the difference between the first temperature value and the second temperature value is within a normal range, simple physical short circuit of the first communication means is expected, and therefore the driver is informed that inspection is necessary through the display device of the vehicle. On the other hand, in the case in which the difference between the first temperature value, measured by the first temperature sensor located close to the gas discharge portion, and the second temperature value, measured by the second temperature sensor located spaced apart from the gas discharge portion by a predetermined distance, is within an abnormal range, i.e. the first temperature value is higher by a determined range or more than the second temperature value, there is a strong possibility of the battery pack overheating or catching fire, and therefore the driver is informed that it is necessary to rapidly evacuate the vehicle.

Meanwhile, a sensing method using the vehicle battery fire sensing apparatus according to the third preferred embodiment of the present invention is identical to the sensing method described with reference to FIG. 8 except that a first pressure value is transmitted to the ECU via the fourth communication means, and a sensing method using the vehicle battery fire sensing apparatus according to the fourth preferred embodiment of the present invention is identical to the sensing method described with reference to FIG. 9 except that a first pressure value and a second pressure value are transmitted to the ECU via the fourth communication means and the fifth communication means, respectively, and therefore a detailed description of each of the sensing methods will be omitted.

Also, in a sensing method using the vehicle battery fire sensing apparatus according to the fifth preferred embodiment of the present invention, the sensing method of the first embodiment and the sensing method of the third embodiment are simultaneously realized, and therefore a detailed description of the sensing method will be omitted.

Figure 10:
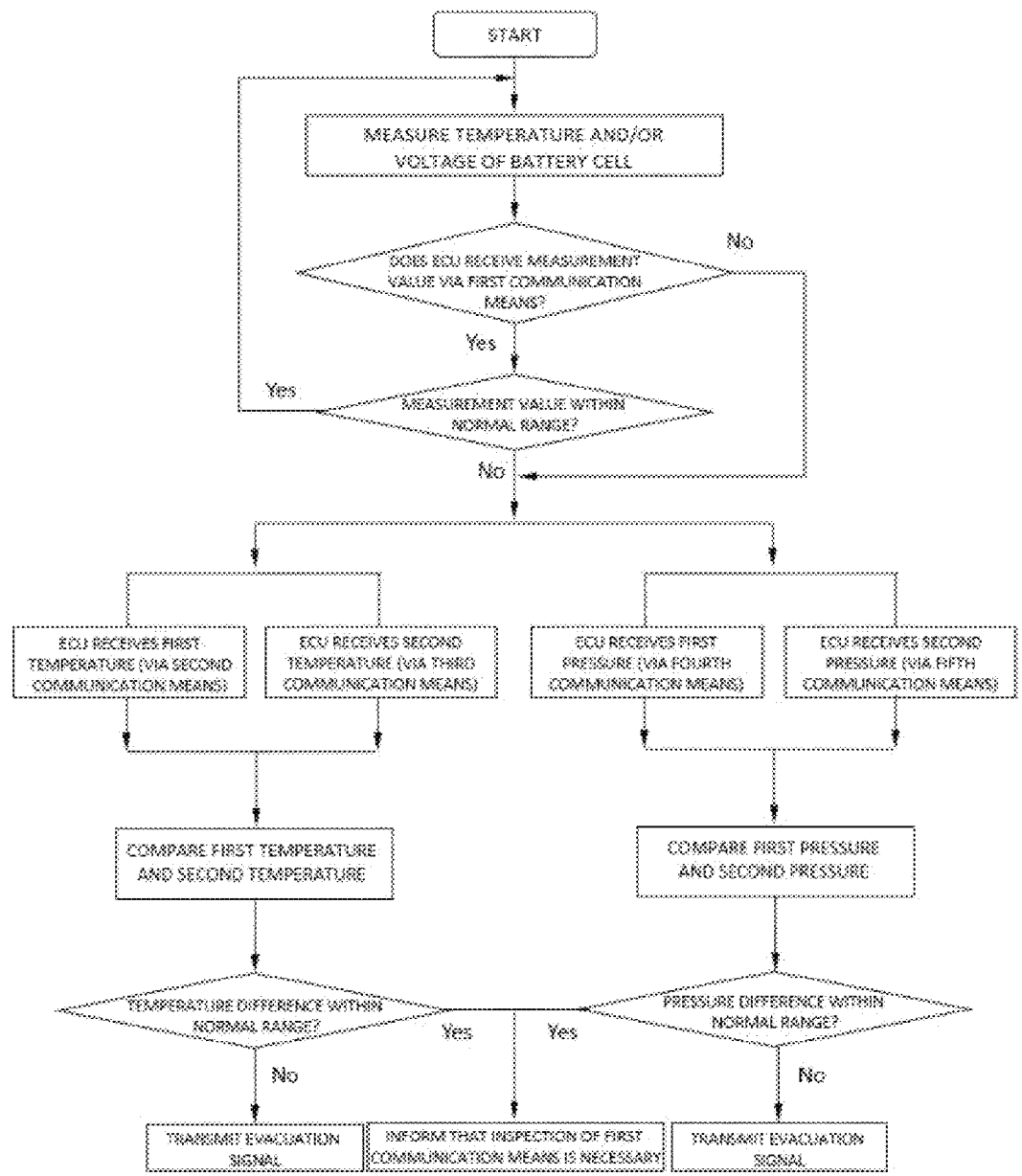
FIG. 10 is an algorithm illustrating a sensing method using the vehicle battery fire sensing apparatus according to the sixth preferred embodiment of the present invention.

FIG. 10 is an algorithm illustrating a sensing method using the vehicle battery fire sensing apparatus according to the sixth preferred embodiment of the present invention.

A first step to a third step are identical to those of the sensing method described with reference to FIG. 8. Hereinafter, therefore, a description of the first step to the third step will be omitted, and only different constructions will be described.

The sensing method may include a fourth step of transmitting a first temperature value, a second temperature value, a first pressure value, and a second pressure value to the ECU via the second communication means to the fifth communication means, respectively, in the case in which the third step is not satisfied, and a fifth step of comparing the received first temperature value and the received second temperature value with each other, comparing the received first pressure value and the received second pressure value with each other, determining whether each difference value is within a normal range, and transmitting a notification signal.

In particular, not only the difference between the temperature values but also the difference between the pressure values is compared in the fifth step, whereby it is possible to further accurately determine the situation in the battery pack 200.

Although the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS

100: Vehicle structure
110: First connector
120: First temperature sensor
130: Second temperature sensor
140: First pressure sensor
150: Second pressure sensor
200: Battery pack
210: Battery module
211: Second connector
220: Battery management system
221: Third connector 222: Fourth connector
230: Battery pack case
231: Gas discharge portion
300: Electronic control unit (ECU)
310: Fifth connector
400: Communication means
410: First communication means
420: Second communication means
430: Third communication means
440: Fourth communication means
450: Fifth communication means

The invention claimed is:
1. A vehicle battery fire sensing apparatus comprising:
a battery pack mounted to a vehicle structure; and
an electronic control unit,
wherein the battery pack comprises:
a battery module comprising one or more battery cells;
a battery management system configured to transmit a signal received from the battery module to the electronic control unit; and
a battery pack case having a gas discharge portion configured to allow venting gas to be discharged therethrough, and
a sensor attached directly to the vehicle structure and spaced from the battery pack case, the sensor being configured to measure at least one of temperature or pressure of the gas discharged from the gas discharge portion.

2. The vehicle battery fire sensing apparatus according to claim 1, wherein the sensor is a first temperature sensor, and
wherein the vehicle battery fire sensing apparatus further comprises a second communicator having a first side connected to the first temperature sensor and a second side connected to the electronic control unit.

3. The vehicle battery fire sensing apparatus according to claim 1, wherein the sensor is a first pressure sensor, and
wherein the vehicle battery fire sensing apparatus further comprises a fourth communicator having a first side connected to the first pressure sensor and a second side connected to the electronic control unit.

4. The vehicle battery fire sensing apparatus according to claim 2, further comprising:
a second temperature sensor located at a position spaced apart from the first temperature sensor by a predetermined distance; and
a third communicator having a first side connected to the second temperature sensor and a second side connected to the electronic control unit.

5. The vehicle battery fire sensing apparatus according to claim 3, further comprising:
a second pressure sensor located at a position spaced apart from the first pressure sensor by a predetermined distance; and
a fifth communicator having a first side connected to the second pressure sensor and a second side connected to the electronic control unit.

6. The vehicle battery fire sensing apparatus according to claim 2, further comprising a first pressure sensor,
wherein the first temperature sensor and the first pressure sensor are located adjacent to each other.

7. The vehicle battery fire sensing apparatus according to claim 1, wherein the gas discharge portion is at least one of a membrane or a rupture disk configured to be ruptured when the pressure is equal to or higher than a predetermined pressure.

8. A vehicle battery fire sensing method using the vehicle battery fire sensing apparatus according to claim 1, the vehicle battery fire sensing method comprising:
a first step of measuring at least one of a temperature or a voltage of the battery module;
a second step of transmitting a first measurement value in the first step to the electronic control unit (ECU);
a third step of the electronic control unit (ECU) receiving the first measurement value and determining whether the received first measurement value is within a normal range;
returning to the first step when the first measurement value received by the electronic control unit (ECU) is within the normal range;
a fourth step of transmitting a second measurement value of temperature or pressure of the vehicle structure to the electronic control unit (ECU) when the electronic control unit (ECU) does not receive the first measurement value or the received first measurement value deviates from the normal range; and
a fifth step of the electronic control unit (ECU) determining whether the received second measurement value of the vehicle structure is within a normal range and transmitting a notification signal.

9. The vehicle battery fire sensing method according to claim 8, wherein the second measurement value in the fourth step is a first temperature and is transmitted to the ECU via a second communicator.

10. The vehicle battery fire sensing method according to claim 8, wherein the second measurement value in the fourth step is a first pressure and is transmitted to the ECU via a fourth communicator.

11. The vehicle battery fire sensing method according to claim 8, wherein the second measurement value in the fourth step comprises a first temperature, transmitted via a second communicator, and a second temperature, transmitted via a third communicator.

12. The vehicle battery fire sensing method according to claim 11, further comprising determining whether the second measurement value in the fifth step is within the normal range based on a difference between the first temperature and the second temperature.

13. The vehicle battery fire sensing method according to claim 8, wherein the second measurement value in the fourth step comprises a first pressure, transmitted via h a fourth communicator, and a second pressure, transmitted via a fifth communicator.

14. The vehicle battery fire sensing method according to claim 13, further comprising determining whether the second measurement value in the fifth step is within the normal range based on a difference between the first pressure and the second pressure.

15. The vehicle battery fire sensing apparatus according to claim 1, wherein the sensor is a pressure sensor.

* * * * *